United States Patent [19]

Okano

[11] 4,029,188

[45] June 14, 1977

[54] CONTROL APPARATUS OF STEERING CLUTCH FOR TRACTOR

[75] Inventor: Toshikatsu Okano, Mikawamachi, Japan

[73] Assignee: Kabushiki Kaishi Komatsu Seisakusho, Tokyo, Japan

[22] Filed: Nov. 18, 1975

[21] Appl. No.: 633,103

[52] U.S. Cl. .................. 192/109 F; 192/87.13; 137/625.69

[51] Int. Cl.² ........................................ F16D 25/10

[58] Field of Search .......... 192/109 F, 85 C, 13 R, 192/87.13, 87.18, 87.19

[56] References Cited

UNITED STATES PATENTS

| | | | |
|---|---|---|---|
| 2,773,578 | 12/1956 | Burnett | 192/85 C |
| 2,952,347 | 9/1960 | Richardson | 192/109 F |
| 3,374,846 | 3/1968 | Massone | 192/13 R X |
| 3,437,187 | 4/1969 | Umeda et al. | 192/87.13 |
| 3,823,801 | 7/1974 | Arnold | 192/109 F |
| 3,922,997 | 12/1975 | Jameson | 192/109 F |

Primary Examiner—Benjamin W. Wyche
Attorney, Agent, or Firm—Armstrong, Nikaido & Marmelstein

[57] ABSTRACT

A control apparatus of a steering clutch for a tractor with distinctive features including a pair of yokes which release and control, under pressure, the lefthand and righthand steering clutches and which are connected with a pair of operating pistons respectively, with individual pressure receiving chambers of the said individual operating pistons being connected with a liquid pressure source, respectively by way of a control valve, and a pair of spools controlling the supply of the liquid delivered from the liquid pressure source to one of the pressure receiving chambers by the control valve in response to the action of the lefthand and righthand steering clutch control units so constructed as to have a progressive working valve increasing progressively the pressure of the said liquid supplying unit in response to the degree of control of the steering clutch control unit.

3 Claims, 5 Drawing Figures

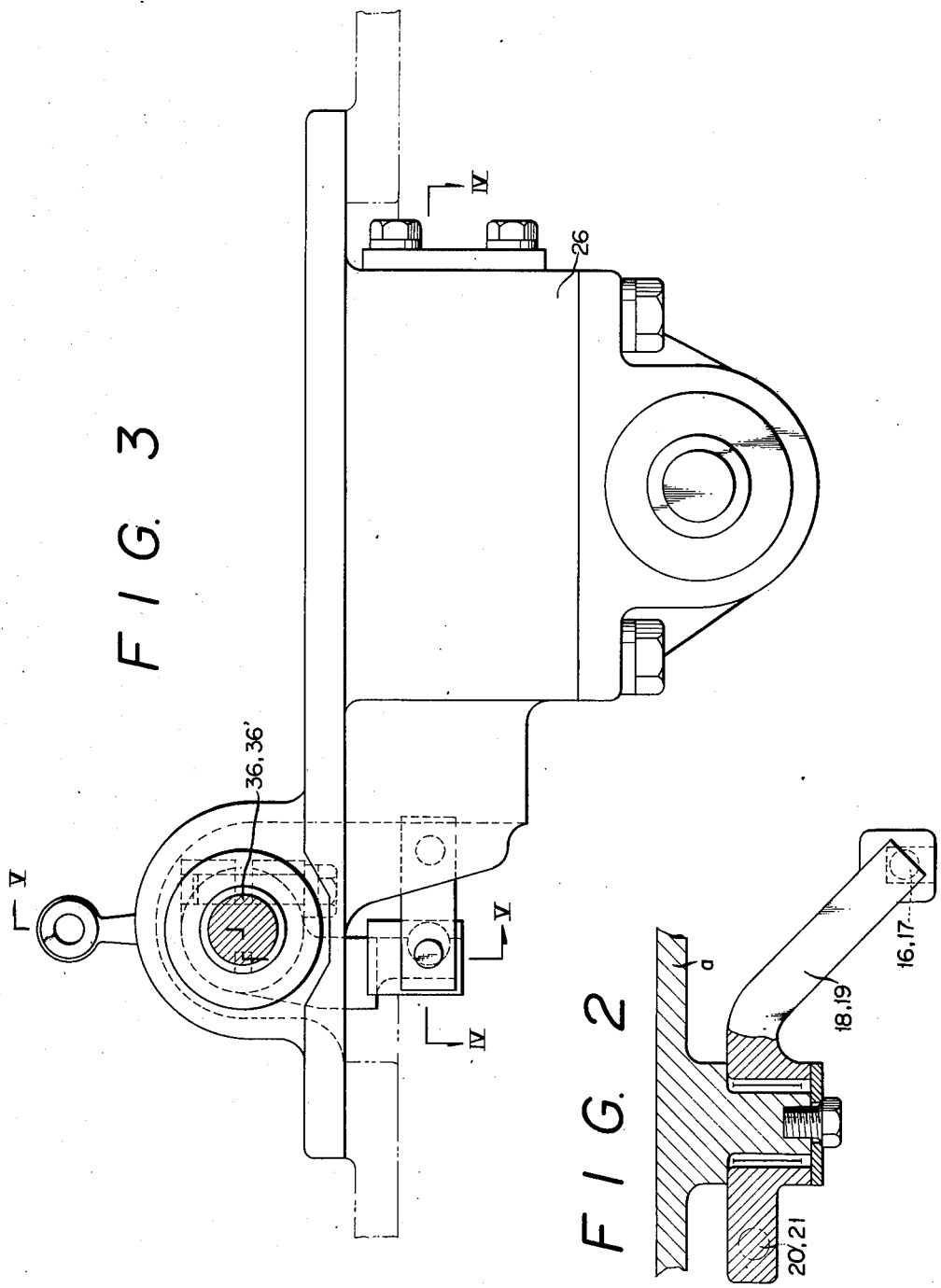

_4,029,188_

CONTROL APPARATUS OF STEERING CLUTCH FOR TRACTOR

BACKGROUND OF THE INVENTION

The present invention relates to a control apparatus which releases and connects under pressure the steering clutch of a tractor. The controlling apparatus of steering clutches of this kind has already been described in, for example, U.S. Pat. No. 3,262,525. The apparatus involved in the present invention is a liquid pressure apparatus which transmits the clutch releasing force to either one of the two steering clutches. The clutches are installed on the driving units of the crawlers located on both sides of the tractor and when a clutch on one side is released, the crawler on one side only is driven to preform the steering action in a well known manner. Another example is given in, for instance, Japanese Pat. No. 46-23845; this corresponds to the U.S. patent application Ser. No. 626,491.

SUMMARY OF THE INVENTION

The object of the present invention is to provide a steering clutch control apparatus for a tractor, which operates by liquid pressure the yoke which releases and connects, under pressure, the steering clutch.

Another object of the present invention is to provide a steering clutch control apparatus which eliminates adjustment of the stroke length of the yoke even when the clutch plate of the steering clutch is worn.

Other objects, features and advantages of the present invention will be readily apparent from the following description taken in conjunction with accompanying drawings.

BRIEF DESCRIPTION OF THE DRAWINGS

FIG. 2 represents an enlarged view of the mounting location of the yoke.

FIG. 3 represents a side view of FIG. 1.

DETAILED DESCRIPTION OF THE INVENTION

Figure 1:
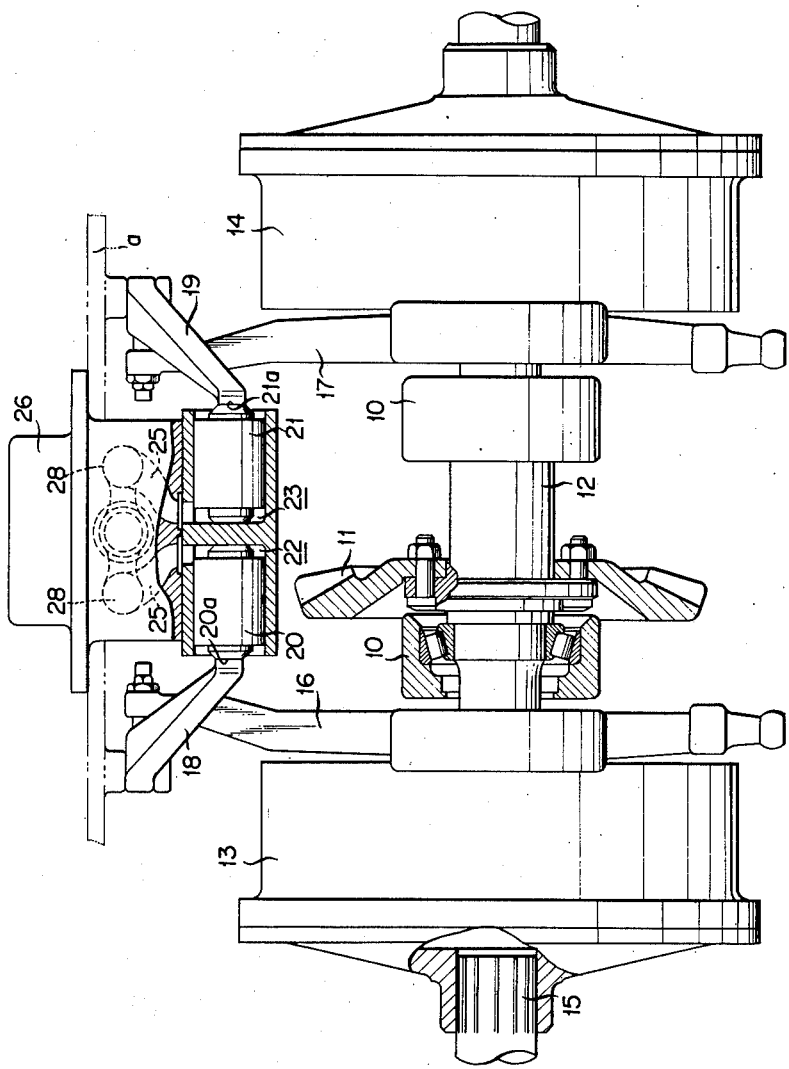
FIG. 1 represents a partially sectioned front view of the present invention.

FIG. 1 represents a cross sectional view of a steering clutch of a crawler-driven tractor and a pair of clutches 13 and 14 are installed, respectively, on each side of a driving shaft 12 provided with a bevel gear 11 supported so as to be free to rotate on bearings 10. Driving power is transmitted to a driving mechanism (not shown) by means of a shaft 15 which is shown only on one side thereof. Each of the clutches 13 and 14 are in a type of clutch lining engagement which employs pressing springs (not shown), the clutch being released by operating yokes 16 and 17 against the pressing springs.

The extreme end of each of the pair of yokes 16 and 17, mentioned above, is anchored on one end surface of the swinging levers 18 and 19, respectively, and is supported so as to be free to swing on the chassis a of the vehicle, respectively, and further, the other extreme end of each of the swinging levers 18 and 19 is anchored on the end surfaces 20a and 21a of the operating pistons 20 and 21 and the apparatus is so constructed that, when the operating pistons 20 and 21 elongate and operate, the steering clutches 13 and 14 are released by means of the swinging levers 18 and 19.

A pair of operating pistons 20 and 21 mentioned above are allowed to elongate and contract in opposing directions and at the same time, the pressure receiving chambers 22 and 23 are connected to the first outlet port 27 and to the second outlet port 28 respectively of a control valve 26, which shall be described in the latter part of this specification, by way of the oil passages 24 and 25.

Figure 4:
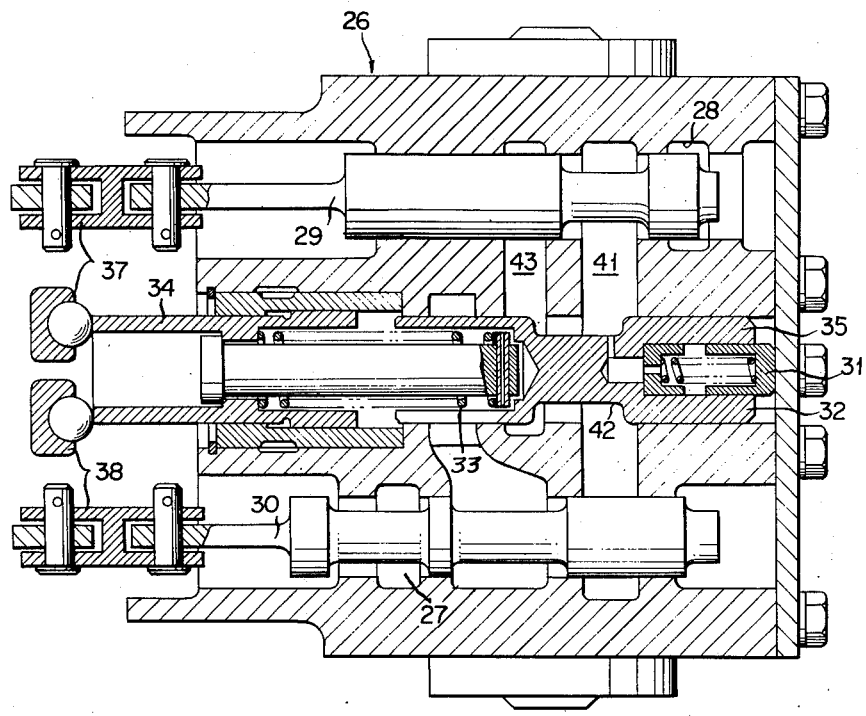
FIG. 4 represents a cross sectional view along the line IV — IV of FIG. 3.
Figure 5:
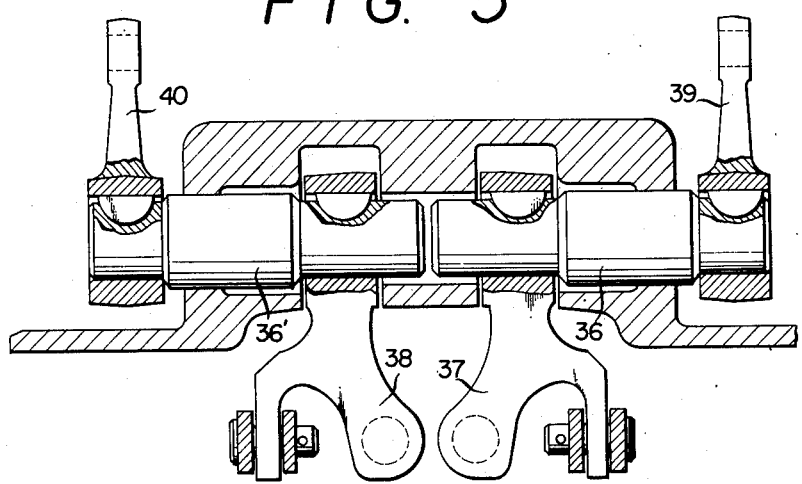
FIG. 5 represents a cross sectional view along the line V — V of FIG. 3.

Referring to FIG. 4, the control valve 26 comprises a pair of spools 29 and 30, a pressure regulating valve 32 incorporating a load piston 31, a shifting sleeve slidably disposed within the control valve 26, and spring 33 disposed between the pressure regulating valve 32 and the sleeve 34. The pair of spools 29 and 30 as well as the sleeve 34 are connected to a pair of forked levers 37 and 38 which in turn are connected to shafts 36 and 36'. The shafts 36 and 36' are connected to the left and right hand operating units, for example, steering levers, etc., which are not shown in the drawings, via a pair of operating levers 39 and 40 which are connected to the extreme ends of shafts 36 and 36'.

The function of the control apparatus embodying the present invention shall be explained in the following:

FIG. 4 represents a condition in which the clutches 13 and 14 are not in the position of performing the releasing function. In this position, liquid from a pump passage 41 flows into the drain passage 43 by way of a recessed annular portion 42 of a relief valve 35 which is maintained in an open condition.

When operation of releasing of the clutch is transmitted from the condition mentioned above to the lever 39, the forked lever 37 is allowed to operate, shifting the sleeve 34 of relief valve 35 as well as the spool 29 in the righthand direction in the illustration.

By this operation, the spool 29 opens the second outlet port 28 to direct fluid under pressure from a pump to the pressure receiving chamber 23 located on one side of the operating piston 21. On the other hand, the shifting sleeve 34 functions in such a way that when the relief spring 33 is compressed, the pressure regulating valve 32 is pushed in the righthand direction in the illustration and the communication of the drain passage 43 and the pump passage 41 by the recessed annular portion 42 is blocked. Consequently, liquid pressure in the oil passage 25 leading to the pump passage 41 and the pressure receiving chamber 23 of the operating piston is made to increase progressively and when it is brought to balance with the load caused by the relief spring 33, the recessed annular portion 42 of the relief valve 35 is opened for performing a relief function.

This relief function provides a progressive increase in the load of the relief spring 33 as the shifting sleeve 34 is allowed to shift in the righthand direction in the illustration and, consequently, the relief pressure also takes a progressive increase, allowing the operating piston 21 to move in the righthand direction in the illustration whereupon the yoke 17 is made to tilt by means of the swing lever 19 in the righthand direction in the illustration, thus releasing the steering clutch 14 located on the righthand side.

Further, when the lever 40 is operated, the spool 30 and the shifting lever 34 are operated by means of the forked sleeve 38 and the operating piston 20 is activated by liquid pressure, and then the yoke 16 is tilted in the righthand direction in the illustration to release the steering clutch 13 located on the lefthand side.

Moreover, when the levers 39 and 40 located on the lefthand and righthand sides, respectively, are operated at the same time, the pair of the spools 29 and 30 as well as the shifting sleeve 34 are operated, the same functional procedures are followed to release the lefthand and righthand steering clutches 13 and 14.

The present invention is so constructed as mentioned hereinbefore that, when the steering clutch operating unit is activated liquid from the hydraulic pressure source is supplied at a progressively increasing rate to the pressure receiving chambers 22 and 23 of the operating pistons 20 and 21, respectively, and the yokes 16 and 17 are operated by means of the operating pistons 20 and 21 to control to release of the steering clutches 13 and 14.

Consequently, if excessive wear of the clutch plates of the steering clutches 13 and 14 causes elongation of the strokes of the yokes 16 and 17, then this causes elongation of strokes of the operating pistons 20 and 21 by corresponding dimensions thus requiring no adjustments of strokes of the yokes 16 and 17.

Further, liquid pressure supplied to the pressure receiving chambers 22 and 23 of the operating pistons 20 and 21 is controlled so as to increase in a progressive manner in correspondence to the operating rate of the steering clutch operating unit and accordingly, the yokes 16 and 17 are brought gradually to release the steering clutches 13 and 14 or to control them so as to be engaged under pressure.

What is claimed is:

1. A control apparatus in a steering clutch for a tractor comprising
   a pair of steering clutches,
   a pair of yokes mounted on said steering clutches to release and connect said steering clutches,
   a pair of rocking levers engaged with said yokes at one end thereof,
   a pair of piston means connected to said pair of rocking levers at the opposing ends of said rocking levers, each of said piston means having a chamber contained therein, and valve means connected to said chambers of said piston means with said valve means comprised of a valve body,
   a first spool slidably disposed in said valve body, a second spool slidably disposed in said valve body, and a relief valve slidably disposed in said valve body, and an operator connected to each said first and second spools and both operators connected to said relief valve for selectively releasing and connecting said pair of clutches and controlling the pressure thereto.

2. A control apparatus in a steering clutch for a tractor according to claim 1 wherein said relief valve comprises a pressure regulating valve having a load piston disposed therein, a shifting sleeve slidably disposed in said valve body and spring means disposed between said pressure regulating valve and said shifting sleeve.

3. A control apparatus in a steering clutch for a tractor according to claim 1 wherein said operators are connected to said first and second spools and said relief valve includes a pair of forked levers, each said forked lever being connected to said first spool and said relief valve and to said second spool and said relief valve, respectively, and a pair of coaxially disposed axes connected to said pair of forked levers and a pair of operating levers connected to said pair of coaxially disposed axes.

* * * * *